United States Patent
Doerr et al.

(10) Patent No.: US 7,529,481 B1
(45) Date of Patent: May 5, 2009

(54) LINEAR OPTICAL SAMPLING METHODS AND APPARATUS

(75) Inventors: Christopher R. Doerr, Middletown, NJ (US); Christophe J. Dorrer, Matawan, NJ (US); Daniel C. Kilper, Rumson, NJ (US); Michael G. Raymer, Eugene, OR (US); Howard R. Stuart, East Windsor, NJ (US); Peter J. Winzer, Tinton Falls, NJ (US)

(73) Assignees: State of Oregon Acting By and Through the State Board of Higher Education on Behalf of The University of Oregon, Eugene, OR (US); Lucent Technologies, Murray Hill, NJ (US)

(*) Notice: Subject to any disclaimer, the term of this patent is extended or adjusted under 35 U.S.C. 154(b) by 718 days.

(21) Appl. No.: 10/801,481

(22) Filed: Mar. 15, 2004

Related U.S. Application Data (60) Provisional application No. 60/455,016, filed on Mar. 13, 2003.

(51) Int. Cl.
*H04B 10/00* (2006.01)
(52) U.S. Cl. .................. 398/16; 398/203; 398/204; 398/205; 398/206; 398/207
(58) Field of Classification Search .............. 398/152, 398/202–207, 16
See application file for complete search history.

(56) References Cited

U.S. PATENT DOCUMENTS

| | | | | |
|---|---|---|---|---|
| 4,718,120 A | * | 1/1988 | Tzeng | .......... 398/204 |
| 4,965,858 A | * | 10/1990 | Naito et al. | .......... 398/205 |
| 5,060,312 A | * | 10/1991 | Delavaux | .......... 398/204 |
| 6,181,420 B1 | * | 1/2001 | Badami et al. | .......... 356/487 |
| 6,456,380 B1 | * | 9/2002 | Naganuma | .......... 356/450 |
| 2003/0063285 A1 | * | 4/2003 | Pering et al. | .......... 356/451 |
| 2004/0114939 A1 | * | 6/2004 | Taylor | .......... 398/152 |
| 2004/0208646 A1 | * | 10/2004 | Choudhary et al. | .......... 398/188 |

OTHER PUBLICATIONS

Y. Lai et al., "Characteristic functions and quantum measurement of optical observables," Quantum Opt. 1:99-115 (1989).

(Continued)

*Primary Examiner*—Kenneth N Vanderpuye
*Assistant Examiner*—Danny W Leung
(74) *Attorney, Agent, or Firm*—Klarquist Sparkman, LLP (57) ABSTRACT

An optical data signal can be sampled by linearly combining the optical data signal with optical sampling pulses, and delivering the combination to first and second balanced detectors. The optical data signal and the optical sampling pulse are configured to have a first phase difference at the first balanced detector and a second phase difference at the second balanced detector. Typically, a difference between the first phase difference and the second phase difference is configured to be about 90 degrees. In-phase and quadrature balanced detector outputs can be combined as a sum of squares to produce a linear sampling signal representative of data signal intensity, and the sample pulses can be configured to temporally step through the optical data signal so that a sampled representation of the optical data signal is obtained.

8 Claims, 5 Drawing Sheets

OTHER PUBLICATIONS

C. Dorrer et al., "High-sensitivity high-resolution sampling using linear optics and waveguide optical hybrid,"OFC 2004 (PDP18), Los Angeles, Feb. 22-27, 2004.

N.G. Walker et al., "Multiport homodyne detection near the quantum noise limit," Optical and Quantum Electronics 18:355-363 (Sep. 1986).

C. Dorrer et al., "Linear optical smapling," Photon. Tech. Lett. 15:1746-1748 (2003).

M. Dinu et al., "Amplitude sensitivity limits of optical sampling for optical performance monitoring," J. Opt. Netw. 1:237-248 (Jul. 2002).

I. Kim et al., "Requirements for the sampling source in coherent linear sampling," Optics Express 12:2723-2739 (Jun. 14, 2004).

* cited by examiner

LINEAR OPTICAL SAMPLING METHODS AND APPARATUS

CROSS-REFERENCE TO RELATED APPLICATIONS

This application claims the benefit of U.S. Provisional Application 60/455,016, filed Mar. 13, 2003, that is incorporated herein by reference.

BACKGROUND

Optical communication systems offering very high data rates have been developed that take advantage of the wide bandwidth and low loss of optical fiber waveguides. For example, commercial communication systems have already reached per-channel data rates of up to 40 Gb/sec, while data rates of 160 Gb/sec and higher are routinely generated in research laboratories. Measurement and characterization of such high data rate signals continues to be challenging. Traditional optoelectronic measurement techniques in which a high-speed photodetector and a sample-and-hold circuit provide the required temporal gating function are generally inadequate at these ultra-high data rates. Nonlinear optical sampling based on mixing an optical data signal with a short sampling optical pulse in a nonlinear optical material can provide higher temporal resolutions due to the availability of short optical pulses. Unfortunately, nonlinear techniques exhibit limited sensitivity because of the low efficiency of the nonlinear optical mixing process. Thus, both conventional optoelectronic and nonlinear optical techniques are of limited value in optical applications that require signal monitoring and characterization at very high bit rates. For example, these conventional techniques are not well suited to optical component testing or adjustment.

A common diagnostic measurement for optical communication systems is the eye diagram. To form an eye diagram, temporally gated samples of a data stream are accumulated over a long time period. Temporal gating is based on a series of sampling strobe pulses, and is implemented at a bandwidth comparable to or greater than the bandwidth associated with the data rate of the data signal being measured. The sampling frequency (the rate at which samples are acquired) can be several orders of magnitude lower than the data rate. In an eye diagram, signal samples are accumulated and displayed based on their relative positions within a periodic bit slot. The resulting eye diagram provides information regarding noise and distortions present in the data signal. Signal averaging of the signal samples is not generally useful because the signal samples within any selected periodic bit slot include samples of both "1" and "0" bits as well as transitions between "1" and "0." In optoelectronic-based eye diagram measurements, the temporal gating window is limited by available electrical bandwidths. In addition, electronic sampling oscilloscopes offer limited sensitivities to weak electrical signals produced by many optical signals. Thus, optoelectronic based eye diagram measurements exhibit inadequate temporal resolution and inadequate sensitivity.

Nonlinear, all-optical measurement techniques can take of advantage of ultrafast optical sources such as mode-locked lasers and fiber-grating compressors. These sources can provide very short optical pulses (less than a ps) at relatively low repetition rates (a few MHz). In nonlinear optical sampling, these short optical pulses are used as sampling (gating) pulses, and an optical data signal can be characterized based on a nonlinear interaction of a sampling pulse with the optical data signal in a nonlinear optical material. For example, an interaction of the sampling pulse and the data signal can produce an optical measurement signal that is proportional to a product of the peak powers of the data and sampling pulses. Because nonlinear optical processes are generally inefficient, high peak powers of the sampling and/or data pulses are generally needed. Thus, these nonlinear optical techniques are associated with higher costs and greater complexity in the sampling source or in the signal under test because additional optical amplification is often needed. Even at high peak powers, these techniques have efficiencies that are undesirably low.

In view of these and other limitations, improved methods and apparatus for optical signal characterization are needed.

SUMMARY

Optical sampling methods include receiving an optical data pulse and an optical sampling pulse. Typically, properties of the sampling pulse such as pulse duration and pulse amplitude are known, or but in some examples, sampling pulse duration is such that contributions to a measurement due to finite pulse duration can be disregarded. In other examples, sampling pulse duration can be "deconvolved" for signal measurements. It is convenient if sampling pulse amplitude is approximately constant, but sampling pulses exhibiting pulse-to-pulse amplitude variations can be used by appropriate measurement signal scaling. Respective pulse portions of the optical data pulse and the optical sampling pulse are directed to a first balanced optical detector with a first phase difference to obtain a first balanced electrical signal and to a second balanced optical detector with a second phase difference to obtain a second balanced electrical signal to obtain samples of the temporal intensity of the data pulse. The first balanced electrical signal and the second balanced electrical signal are combined to obtain a linear sampling signal. In representative examples, a difference between the first phase difference and the second phase difference is about 90 degrees. In other examples, at least one of the first phase difference and the second phase difference is established by directing at least one of the second portion of the optical data pulse and the second portion of the optical sampling pulse through an optical phase retarder. In further examples, both the second portion of the optical data pulse and the second portion of the optical sampling pulse are directed to the optical retarder. In additional examples, the optical retarder is a ¼-wave retarder configured to have an axis that is substantially parallel to a polarization direction of one of the second portion of the optical data pulse or the second portion of the optical data pulse. In additional representative examples, at least one of the phase differences is established by directing at least one of the second portion of the optical data pulse and the second portion of the optical sampling pulse to a thermooptic modulator. According to representative examples, the first balanced electrical signal and the second balanced electrical signal are combined as a sum of squares.

Sampling methods comprise dividing a sampling signal into first portion and a second portion and dividing a test signal such as a data signal into a first portion and a second portion. The first portion of the sampling signal and the first portion of the test signal are mixed in a balanced detector to produce a first balanced electrical signal. A selected phase difference is established between the second portion of the sampling signal and the second portion of the test signal relative to a phase difference between the first portion of the sampling signal and the first portion of the data signal. The second portions are mixed in a balanced detector to produce a second balanced electrical signal, and then combined with the first balanced electrical signal. In representative examples, the selected phase difference is about 90 degrees. In other examples, the selected phase difference is based on an optical path length difference between a first optical path associated with the second portion of the data signal and a second optical path associated with the second portion of the sampling signal. In additional examples, the selected path difference is based on birefringence in a common optical path associated with the second portions of the data signal and the sampling signal.

Optical sampling systems include a data input configured to receive a test signal and a sampling pulse input configured to receive a sampling pulse. The test signal can be an optical data signal or other optical signal. An optical system is configured to produce a first combination of the data input and the sampling pulse and a second combination of the data input and the sampling pulse, wherein the first combination is associated with a first phase difference and the second combination is associated with a second phase difference. A first balanced detector and a second balanced detector are configured to receive the first combination and the second combination, respectively, produce a first balanced signal and a second balanced signal, respectively. A signal processing system is configured to combine the first balanced signal and the second balanced signal. According to representative examples, an optical modulator is configured to establish at least one of the first phase difference and the second phase difference. In other examples, a retardation plate is configured to establish at least one of the first phase difference and the second phase difference. In other representative examples, a difference between the first phase difference and the second phase difference is about 90 degrees.

Optical samplers comprise a signal input configured to receive a test optical signal and an optical system configured to combine the test optical signal with a sampling pulse and deliver the combinations to a first and a second balanced detector to produce a first balanced detector output and a second balanced detector output, respectively. A controller is configured to receive the first balanced detector output and the second balanced detector output and produce an associated sample value. In representative examples, a memory is configured to store the sample value. In other examples, the controller configured to provide a variable time delay of the sampling pulse with respect to a period associated with the test signal. In representative examples, the period is associated with a bit interval. In other representative examples, the optical detection system is configured to combine the test optical signal with sampling pulses corresponding to a plurality of delay times and to produce associated first balanced detector outputs and second balanced detector outputs. The controller is configured to produce corresponding sample values, and the memory is configured to store the sample values. In additional examples, a display is configured to exhibit the stored sample values as a function of the associated delay.

Because coherent linear sampling produces a sampled signal based on spectral differences between a sampling pulse and a data pulse, coherent sampling can be used to select a single spectral channel from a data signal that includes several spectral channels without use of an additional spectral filter. For example, a single channel of a wavelength division multiplexed (WDM) optical signal can be selected and evaluated without attenuation of the unselected channels. Similarly, in signals that are based on optical code-division multiplexed (OCDM), associated temporal/spectral portions for a selected OCDM channel based on, for example, a selected code word can be identified in the presence of unselected channels.

While coherent optical measurements provide direct measurement of data signal intensity, such measurements can be used to characterize data signal properties such as intensity variances and photon number. Other data signal properties such as other statistical properties can be estimated.

While in some examples, linear optical sampling can be dependent on the relative state of polarization (SOP) of the sampling pulses and the data signal, this dependence can be largely removed by providing optical samplers for two polarization states, and combining measurements obtained with the samplers.

These and other features and advantages are described below with reference to the accompanying drawings.

DETAILED DESCRIPTION

Disclosed below are representative methods and apparatus. The disclosed methods should not be construed as limiting in any way. Instead, the present disclosure is directed toward novel and nonobvious features and aspects of the various disclosed embodiments, alone and in various combinations and subcombinations with one another. The methods and apparatus are not limited to any specific aspects or features, or combinations thereof, nor do the methods and apparatus require that any one or more specific advantages be present or problems be solved.

Although the operations of the disclosed methods and apparatus are described in a particular, sequential order for convenient presentation, it should be understood that this manner of description encompasses rearrangement, unless a particular ordering is required by specific language set forth below. For example, operations described sequentially may in some cases be rearranged or performed concurrently. Additionally, the detailed description sometimes uses terms like "determine" and "provide" to describe the disclosed methods. These terms are high-level abstractions of the actual operations that are performed. The actual operations that correspond to these terms will vary depending on the particular implementation and are readily discernible by one of ordinary skill in the art.

Optical waveform measurements and other characterizations can be based on linear optical sampling. In a typical example, a short optical pulse is provided as a measurement or "sampling" gate (a reference pulse), and sampling of a data or other signal is accomplished using coherent homodyne mixing on a photodetector. In other examples, coherent heterodyne detection can be used. For example, an amplitude modulation can be applied to a series of reference pulses. Typically such an amplitude modulation is selected to be a frequencies much less than optical frequencies, such as, for example, frequencies in a range of from about 10 Hz to 10 MHz, but other frequencies could be selected. For convenience, coherent homodyne detection and coherent heterodyne detection can be referred to generally as coherent detection. For convenience, examples based on coherent homodyne detection are described below.

Phase sensitivity that is generally associated with homodyne detection can be removed, if desired, by, for example, measurement of orthogonal phase quadratures. The measurement gate provided by an optical pulse can be readily selected for various applications, and, in some examples, can be associated with laser pulse durations provided by a mode-locked laser or other optical pulse sources. Such optical pulse sources either alone or in combination with pulse compressors can provide pulse durations of less than a picosecond. Thus, very short sampling gates can be provided. A combination of ultrafast optical gating and linear homodyne detection using relatively low speed optoelectronics permits high temporal resolutions with sensitivities that can be 1000 times greater than sensitivities associated with conventional nonlinear optical techniques. In representative examples, eye diagram measurements with peak power products as low as 3.4 mW$^2$ have been made based on linear optical sampling. This sensitivity is about four orders of magnitude better than that obtained by conventional techniques. Minimum input data signal peak powers of about 60 µW or less can be used, in contrast to the milliwatt level power levels needed by conventional techniques.

Figure 1:
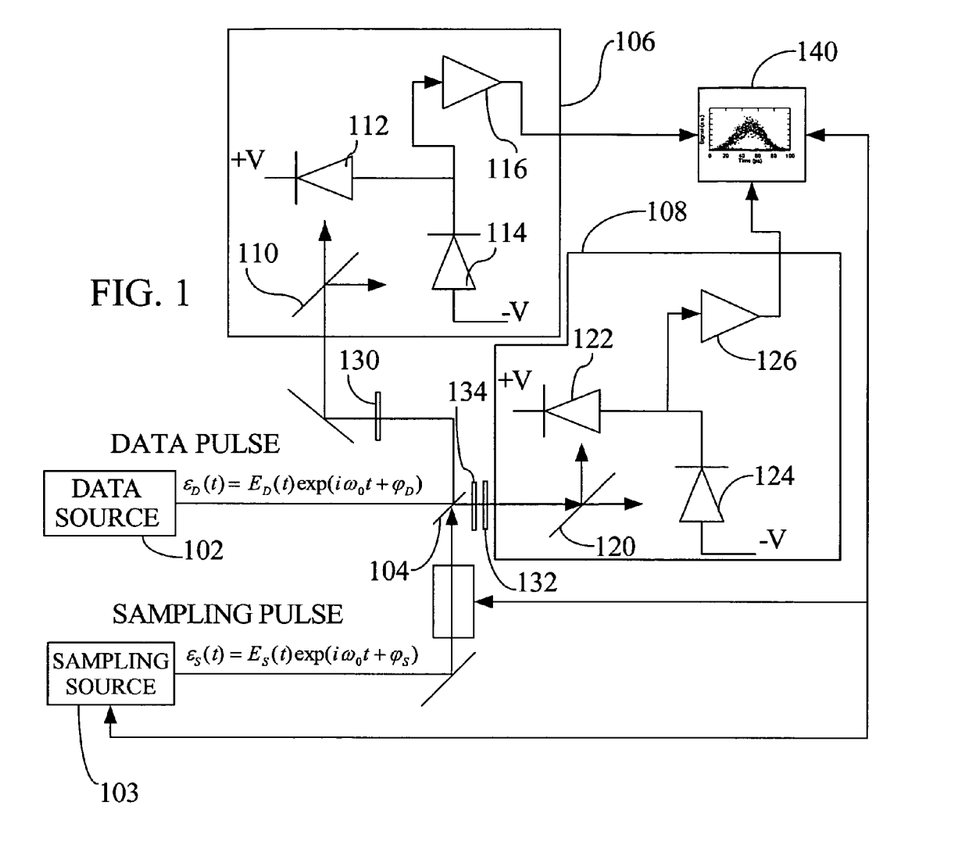
FIG. 1 is a schematic diagram of a representative system for linear optical sampling of an optical data pulse based on free space optics.

With reference to FIG. 1, a data pulse and a sampling pulse are directed from an optical data source 102 and a sampling pulse source 103, respectively, to a beamsplitter 104 that directs portions of the data pulse and the sampling pulse to a first balanced detector 106 and a second balanced detector 108. The first balanced detector 106 includes a polarizing beam splitter (PBS) 110, photodetectors 112, 114 and an amplifier 116. The photodetectors 112, 114 are configured so that a difference of their respective photocurrents is sensed and amplified by the amplifier 116. The second balanced detector includes a polarizing beam splitter (PBS) 120, photodetectors 122, 124, and an amplifier 126. The balanced detectors can be provided as, for example, NEW FOCUS Model 1617 AC balanced detectors, available from New Focus Corporation. Optical phase retardation plates 130, 132, 134 are provided, and are configured to control the state of polarization of the data pulse and the sampling pulse as well as select relative phase shifts between the data pulse and the sampling pulse as described below. Balanced detector output signals are provided to a signal acquisition and display system 140 such as, for example, a personal computer or other processing system, that is configured to display a sampled signal based on the balanced detector output signals.

The data pulse can be associated with an electric field $\epsilon_D(t)=E_D(t)\exp(i\omega_0 t\, \phi_D)$ and the sampling pulse can be associated with an electric field $\epsilon_S(t)=E_S(t)\exp(i\omega_0 t\phi_S)$, wherein $\omega_0$ is an optical carrier frequency, $E_D(t)$ and $E_S(t)$ are slowly varying analytic signals, and $\phi_D$ and $\phi_S$ are carrier-envelope phase offsets of the data pulse and the sampling pulse, respectively. For a series of pulses (a pulse "train"), each pulse typically is associated with a different carrier-envelope phase offset because, for example, the optical carrier frequency $\omega_0$ is not necessarily an integer multiple of a pulse repetition rate.

The balanced detectors are configured to receive portions of the data pulse and the sampling pulse, and produce a balanced electrical signal in which signal contributions proportional to sampling pulse energy or intensity fluctuations are eliminated or substantially reduced. Operation of the first balanced detector 106 can be described as follows. Photocurrents (detected optical signals) produced at the photodetectors 112, 114 by a combination of the data pulse and the sampling pulse are proportional to a square of a sum of the two fields. The detected signals are proportional to:

$$B_S+B_D+2\mathrm{Re}[\int \epsilon_D(t)\epsilon_S^*(t-\tau)dt], \text{ and}$$

$$B_S+B_D-2\mathrm{Re}[\int \epsilon_D(t)\epsilon_S^*(t-\tau)dt], \quad (1)$$

wherein $B_S$ and $B_D$ are background terms proportional to sampling pulse power and data pulse power, respectively, and $\tau$ is a relative delay between the data pulse and the sampling pulse. The third terms represent so-called interferometric components and are indicative of relative pulse shapes of the data pulse and the signal pulse and are proportional to data pulse field amplitude. The polarizations of the data pulse and the sampling pulse are assumed to be the same in Equation 1 so that these pulses interfere when mixed on a photodetector. In a typical example, a first photodetector of a balanced photodetector receives a first polarization component and a second photodetector receives an orthogonal component. While the polarizations of the pulses at a detector need not be identical, the pulses must have at least some polarization overlap or the interferometric terms will be zero.

The background terms generally contribute noise associated with, for example, fluctuations in sampling pulse energy or power. The interferometric components can be extracted and the background terms eliminated or substantially reduced by subtracting the two detected optical signals. A difference of the two detected optical signals $S_1(\tau)$ can be expressed as $S_1(\tau)=4Re[\int \epsilon_D(t)\epsilon_S^*(t-\tau)dt]$, wherein $$S_1(\tau)=4Re[\{\int E_D(t)E_S^*(t-\tau)dt\}\exp[i(\omega_0\tau+\phi_D-\phi_S)]] \qquad (2)$$

ignoring constant factors associated with, for example, photodetector quantum efficiency, differential amplifier gain, and other factors. Note that the quantity $E_D(t)E_S^*(t-\tau)$ is a slowly varying function of the delay $\tau$ in contrast to the quantity $\exp[i(\omega_0\tau+\phi_D-\phi_S)]$ that is a rapidly varying function of the delay $\tau$ due to the optical carrier frequency $\omega_0$. Changes in the relative delay $\tau$ between the two pulses by a significant fraction of an optical cycle (approximately 5 fs for optical radiation at wavelengths of about 1550 nm) or in the carrier-envelope offsets can produce substantial changes in $S_1(\tau)$. In addition, any phase noise present in either the sampling or data sources can directly translate into noise in $S_1(\tau)$ that can be much large than the intended signal. Phase-locking the two sources can eliminate or reduce the magnitude of such noised, but phase-locking can be inconvenient or impractical. Phase averaging, i.e. measurement of a root-mean-square (RMS) value of $S_1(\tau)$ when the phase between the two pulses is random, can be used to measure an average data pulse shape for periodic signals (pulse trains). The random modulation present in a typical data signal prohibits effective signal averaging of data signals.

This phase dependence can be reduced or eliminated by measuring, for the same data and sampling pulses, both quadratures, i.e. the real and imaginary parts of the interferometric component, or equivalently, the zero and $\pi/2$-shifted phase components of the signal field. This can be accomplished using the first and second balanced detectors 106, 108, and introducing an additional $\pi/2$ phase shift between the fields in the second balanced detector. With such a phase shift, an output $S_2(\tau)$ of the second balanced photodetector 108 can be expressed as:

$$S_2(\tau)=4Im[\int \epsilon_D(t)\epsilon_S^*(t-\tau)dt]=4Im[\int E_D(t)E_S^*(t-\tau)dt\exp[i(\omega_0\tau+\phi_D-\phi_S)]] \qquad (3)$$

wherein constant factors and offsets are not shown. For convenience, balanced detector signals such as $S_1(\tau)$, $S_2(\tau)$ are referred to generally herein as being associated with a first phase difference and a second phase difference, respectively, between data pulses and sampling pulses. With phases selected so that a difference between the first phase difference and the second phase difference is about $\pi/2$, these balanced detector signals can be conveniently referred to as an in-phase signal and a quadrature signal, respectively. It will be apparent that the designation of a particular signal as an in-phase signal or a quadrature signal is arbitrary, and selection of the phase difference between the two signals is associated with removal or reduction of fringes in the linear optical sampling signal. Thus, for a phase shift of about $\pi/2$, the in-phase and quadrature signals $S_1(\tau)$, $S_2(\tau)$ can be squared and summed by, for example post-detection electronics or in software, to produce a total measurement signal $S(\tau)$ that can be expressed as:

$$S(\tau)=[S_1(\tau)]^2+[S_2(\tau)]^2=16|\int E_D(t)E_S^*(t-\tau)dt|^2 \qquad (4)$$

The signal $S(\tau)$ is proportional to the modulus squared of a cross-correlation between the sampling pulse field and the data pulse field. This signal can be referred to as a linear optical sampling signal. The phase dependence of the terms $S_1(\tau)$, $S_2(\tau)$ associated with the complex exponential $\exp[i(\omega_0\tau+\phi_D-\phi_S)]$ is absent from $S(\tau)$. As shown in Equation 4, the modulation has been completely removed, but in other examples, the modulation is substantially or partially reduced.

Conventional nonlinear optical sampling produces measurement signals associated with a quantity $\int |E_D(t)|^2|E_S(t-\tau)|^2 dt$, which for short sampling pulses, is proportional to a data pulse intensity $I_D(\tau)$ and phase information is unavailable. Some phase information is preserved in linear optical sampling signals $S(\tau)$. Rewriting Eqn. (4) in terms of Fourier transforms $\tilde{E}_D(\omega)$, $\tilde{E}_S(\omega)$ of the data pulse and the sampling pulse, respectively, the total linear sampling signal $S(\tau)$ can be expressed as $$S(\tau)\sim|\mathfrak{F}\{\tilde{E}_D(\omega)\tilde{E}_S^*(\omega)\}|^2, \qquad (5)$$

wherein $\mathfrak{F}$ represents a Fourier transform. Thus, linear optical sampling (field sampling) is sensitive to a relative phase difference between the data pulse and the sampling pulse as well as any spectral displacement between the data and sampling pulses. If the sampling pulse has an approximately constant spectral amplitude and phase in a frequency range corresponding to the data signal, then the sampling pulse term $\tilde{E}_S(\omega)$ can be extracted from the Fourier transform integral, and the linear field sampling signal can be written as $S(\tau)\sim|\mathfrak{F}\{\tilde{E}_D(\omega)\}|^2=I_D(\tau)$, which is equivalent to the nonlinear sampling result in which the time resolution is sufficient to recover all of the time-dependent features present in the intensity waveform. If the sampling pulses have approximately constant spectral densities and phase over the range of optical frequencies in which the data signal has significant spectral density, the linear sampling $S(\tau)$ provides an undistorted instantaneous value of data signal intensity. Referring to Eqn. (5), is apparent that only those portions of the sampling pulse spectrum that overlap the data spectrum contribute to the linear sampling signal, as the linear sampling measurement is a homodyne measurement. Other spectral components of the sampling signal pulses can be removed using one or more optical filters, although this is optional as the homodyne measurement is "blind" to these spectral components.

Figure 2:
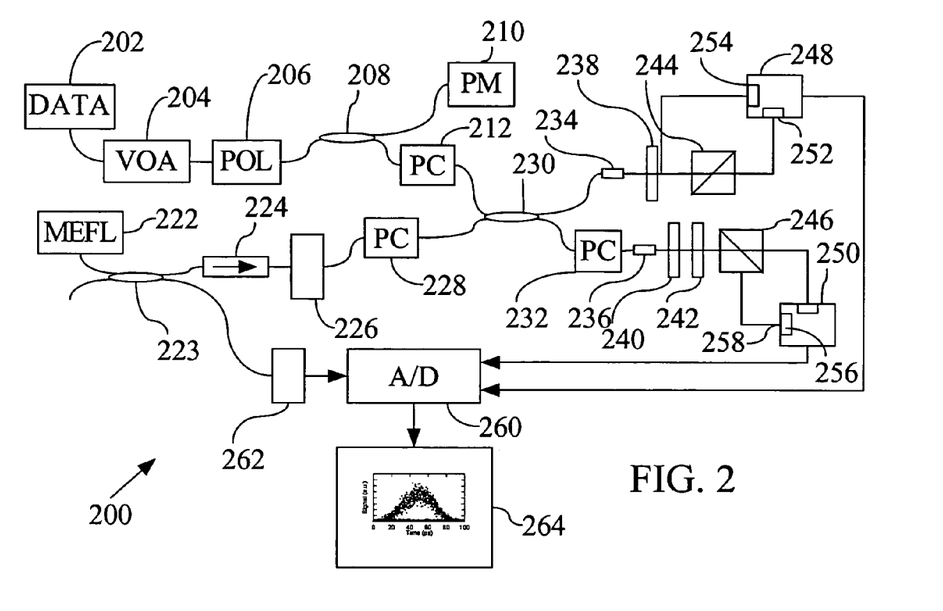
FIG. 2 is a schematic diagram of a representative linear optical sampling system that includes fiber couplers.

Linear optical sampling can be used in equivalent time measurement of repetitive optical signals or to measure eye diagrams of data signals having a predetermined clock frequency or for which a bit interval can be otherwise established. A signal to be evaluated is combined with sampling pulses so that substantially orthogonal balanced detector signals are produced. A series of sampling pulses can be described as $\Sigma E_{S,N}(t-NT)$, wherein N is an integer identifying an Nth pulse in the series, T is a sampling pulse delay, and $E_{S,N}$ is a sampling pulse amplitude. By optically coupling the signal under test and the sampling series in the apparatus of FIGS. 1-2, a time-integrated, linear sampling signal can be obtained that can be described as:

$$S_N=|\int E_D(t) \cdot E_{S,N}*(t-NT)dt|^2 = |\int E_D(\omega) \cdot E_{S,N}*(\omega) \cdot \exp(iN\omega T)d\omega|^2$$

where $\omega$ is an optical frequency, and $E_D$ is associated with a data signal amplitude In a particular example, linear optical sampling measurements were conducted on a 10 Gb/sec optical pulse train. In this example, the sampling pulses were provided by a source running at a repetition rate $1/T_S$ that is much lower than a data rate $1/T_D$. Because $T_S \neq NT_D$ for any integer N, the sampling pulses systematically scan a sampling pulse delay $\tau_n$ for an nth sampling pulse. The scanning rate is about $T_D/(T_S-NT_D)$ samples per bit period, wherein N is the largest integer such that $NT_D<T_S$. In representative measurements, $T_S$ is fixed by the repetition rate of a mode-locked laser, and $T_D$ is adjusted so that several hundred samples are associated with a measurement of a data pulse interval. During scanning, fringes appear in the individual balanced detector signals because the delay $\tau_n$ and the carrier envelope phases $\phi_D$ and $\phi_S$ vary as a function of sample number n.

Phase shifts between the data pulse and the sampling pulse as provided to the first and second balanced detectors can be conveniently selected using the retardation plates 130, 132, 134. For example, a state of polarization (SOP) of the data pulse can be configured to be linear and directed along an axis parallel to a direction $\hat{x}$, and a state of polarization of the sampling pulse can be configured to be linear and directed along an axis parallel to $\hat{y}$, wherein $\hat{x}$, $\hat{y}$ are unit vectors along an x-axis and a y-axis of a coordinate system. The retardation plate 130 can be selected as a ½-wave retarder with an axis at an angle of $\pi/8$ with respect to the x-axis so that the data pulse polarization and the sample pulse polarization are parallel to $\hat{x}+\hat{y}$ and $\hat{x}-\hat{y}$, respectively, after transmission through the retardation plate 130. The PBS 110 then directs x-components and y-components of the data pulse and the sampling pulse to respective detectors in the first balanced detector 106. The retardation plate 134 can be a ½-wave retarder with an axis at an angle of $\pi/8$ with respect to the x-axis to produce SOPs similar to those provided to the first balanced detector 106. The retardation plate 132 can be a ¼-wave retarder configured to produce a $\pi/2$ phase shift between the data pulse and the sampling pulse, and is typically arranged to have a fast or slow axis parallel to $\hat{x}+\hat{y}$ or $\hat{x}-\hat{y}$. The PBS 120 then directs polarization components to respective detectors in the second balanced detector 108. Other configurations of retardation plates, SOPs, and beamsplitters in the balanced detectors can also be used. In addition, waveguide retarders, beamsplitters, and/or polarization controllers defined in, for example, electrooptic materials such as lithium niobate can be used, or combinations of free space and waveguide optics. Phase shifts between the data pulse and the sampling pulse can be provided with different optical paths, but a common path configuration based on a ¼-wave retarder provides rejection of common path noise sources.

With reference to FIG. 2, a measurement system 200 based on linear optical sampling is configured to receive a data pulse or a series of data pulses from a data source 202. The data pulses are delivered to a variable optical attenuator (VOA) 204 and a polarizer 206. Polarized data pulses are provided to a fiber coupler 208 that delivers portions of the data pulses to a power monitor 210 and a polarization controller 212. Sampling pulses are provided by a mode-locked, erbium-doped fiber laser (MEFL) 222 configured to deliver an optical sampling pulse or a series of optical sampling pulses to a fiber coupler 223 and an optical isolator 224. The sampling pulses are delivered to a spectral filter 226 and a polarization controller (PC) 228. A fiber coupler 230, typically a 50/50 coupler, is configured to receive portions of the data pulses and the sampling pulses from the PCs 212, 228, respectively. The fiber coupler 230 is typically selected to provide combined portions of the data pulses and the sampling pulses to a polarization controller 232 and a gradient index or other lens 236 that directs the combined pulses to retardation plates 240, 242. A polarizing beamsplitter (PBS) 246 receives the combined portions from the retardation plate 242 and directs respective polarization components of the combined pulses to detectors 250, 258 of a balanced detector 250. Similarly, a lens 234 receives the combined pulses from the fiber coupler 230 and directs the combined pulses to a retardation plate 238 and a PBS 244. The PBS 244 directs respective polarization components of the combined pulses to photodetectors 252, 254 of a balanced detector 248.

Balanced detector outputs based on detected optical signals are provided to an analog-to-digital converter (A/D) 260, such as, for example, a 1250 Gage Compuscope A/D, that receives a trigger signal based on, for example, sampling pulse portions delivered by the MEFL 222 to a trigger module 262. A computer 264 is configured to receive a linear sampling signal and display the linear sampling signal as a function of time. The A/D 260 is configured to receive a first output and a second output from the first balanced detector 248 and the second balanced detector 250, respectively, and provide a measurement signal to the computer 264 or to another measurement, display, or analysis system. The A/D 260 can be provided in the computer 264, but is shown separately in FIG. 2.

Figure 4A:
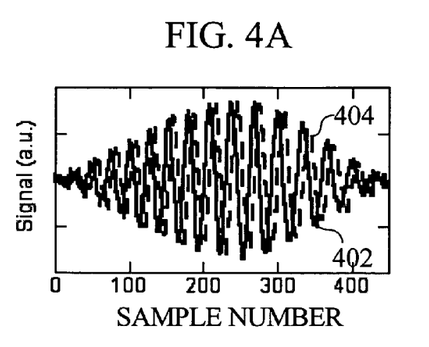
FIG. 4A is a graph depicting in-phase and quadrature balanced detector signals that exhibit interference fringes (oscillations) associated with delays between sampling pulses and data pulses.
Figure 4B:
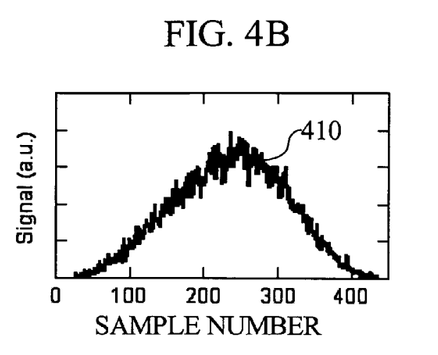
FIG. 4B is a graph depicting a sum of squares of the in-phase and quadrature signals of FIG. 4A.

After A/D conversion, the in-phase and quadrature signals can be numerically squared and summed to obtain a linear sampling signal. FIG. 4A illustrates an in-phase signal 402 and a quadrature signal 404, and a sum of squares of these signals is displayed in FIG. 4B for a periodic pulse train at 10 Gb/s.

Figure 5:
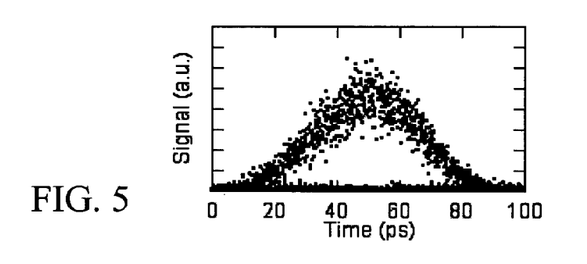
FIG. 5 is an eye diagram of a 10 Gb/s optical data signal having an average data signal power of −10 dBm and an average sampling signal power of −18 dBm produced using linear optical sampling.
Figure 6A:
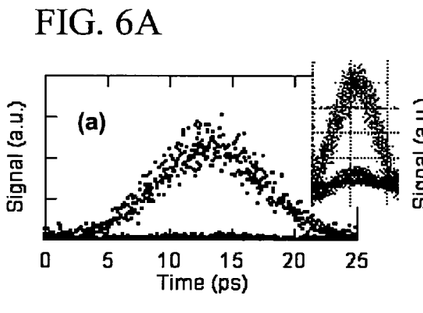
FIGS. 6A-6B are eye diagrams of a 40 Gb/s optical signal obtained by linear optical sampling, and insets illustrating eye diagrams recorded using a 50 GHz sampling oscilloscope. The eyes of FIG. 6A are open, and transmitter misalignment is introduced to produce the closed eyes of FIG. 6B. Data signal power is about −1 dBm and average sampling laser power is about −20 dBm.
Figure 6B:
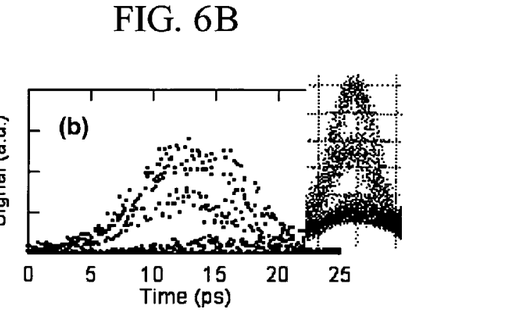
Figure 7:
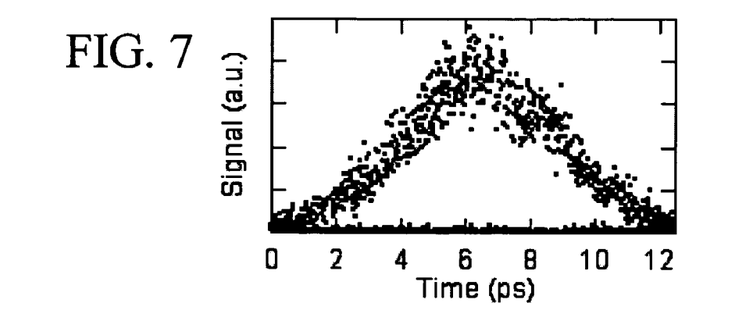
FIG. 7 is an eye diagram of an 80 Gb/s optical data signal recorded using linear optical sampling. Data signal power is about −2 dBm and average sampling laser power is about −20 dBm.

Eye diagrams produced using the system of FIG. 2 are shown in FIGS. 5, 6A-6B, and 7. FIG. 5 is an eye diagram of a 10 Gb/s optical data signal having an average data signal power of −10 dBm and an average sampling signal power of −18 dBm produced using linear optical sampling. FIGS. 6A-6B are an eye diagrams of a 40 Gb/s optical signal, and include insets illustrating eye diagrams recorded using a 50 GHz sampling oscilloscope. The eyes of FIG. 6A are open, and transmitter misalignment is introduced to produce the closed eyes of FIG. 6B. Data signal power is about −1 dBm and average sampling laser power is about −20 dBm. FIG. 7 is an eye diagram of an 80 Gb/s optical data signal. Data signal power is about −2 dBm and average sampling laser power is about −20 dBm.

In the configuration of FIG. 2, orthogonal linearly polarized data and sampling fields are used so that the data and sampling pulses propagate on common optical paths, providing a stable interferometric configuration and to permit a ¼-wave retarder to introduce a $\pi/2$ phase shift. In addition, a Calmar Optcom mode-locked fiber laser is configured to provide sampling pulses at a repetition rate of about 10 MHz. These sampling pulses have a relatively wide spectrum, and a 0.3 nm wide spectral filter can be used for data measurements at 10 Gb/s and a 1 nm wide filter spectral filter can be used for 40 Gb/s and 80 Gb/s data rates.

Figure 3:
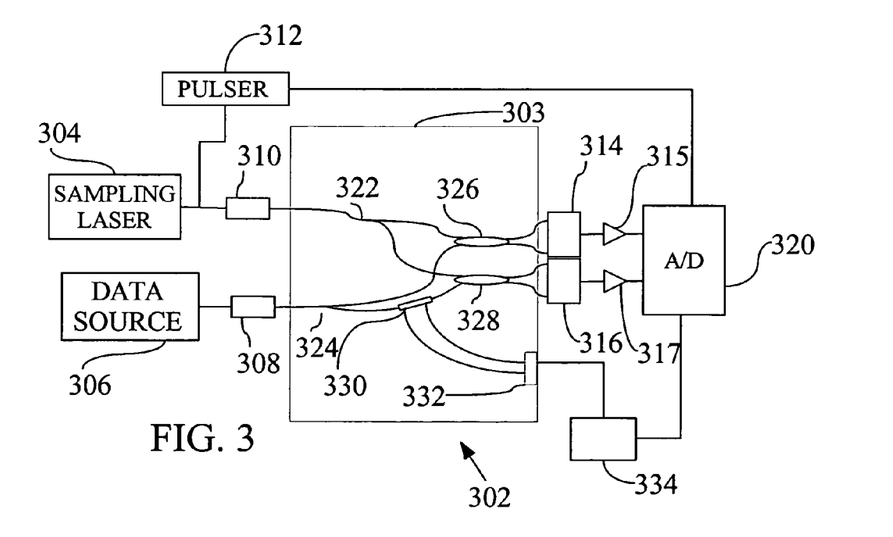
FIG. 3 is a schematic diagram of a representative linear optical sampling system that includes a hybrid pulse combiner configured to provide in-phase and quadrature outputs to associated balanced detectors.

A linear optical sampling system that includes an optical hybrid 302 is illustrated in FIG. 3. A sampling laser 304 is configured to deliver sample pulses at a 10 MHZ repetition rate to pulse trigger 312 and an optical filter 310. A data signal is delivered to a polarization controller 308 and then to the hybrid 302. Sample pulses are split into two portions at a splitter 322 that is defined in a silicon hybrid substrate 303 by silica waveguides. Respective portions are delivered to splitters 326, 328 that are also defined by waveguides in the substrate 303. Data pulses are divided into two portions at a splitter 324 and respective portions are delivered to the couplers 326, 328. The splitter 324 and the couplers 326, 328 can be defined with waveguides defined in the substrate 303. A thermooptic modulator is provided for one of the data pulse paths and can be controlled by a phase controller 334 to produce a $\pi/2$ phase shift. In-phase and quadrature balanced signals are produced by balanced detectors 314, 316, and buffered or amplified by respective amplifiers 315, 316, and delivered to an A/D converter 320. In the example of FIG. 3, data pulse/sampling pulse splitting, combining, and phase control are implemented using silica waveguides formed on a silicon substrate. Such waveguides are defined in a glass layer formed on a silicon substrate, but in other examples, waveguides can be formed on other types of substrates, and some or all splitting functions implemented on one or more substrates.

Figures 8A, 8B, 8C:
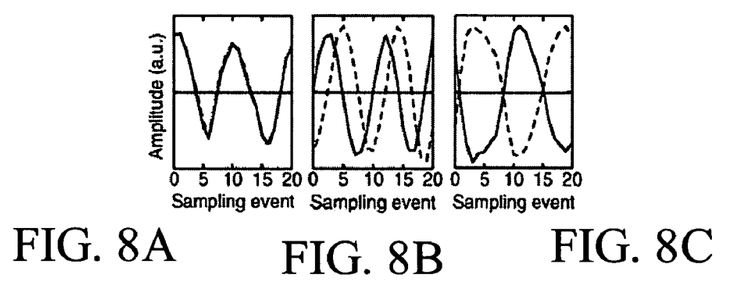
FIGS. 8A-8C are graphs depicting balanced detector signals associated with phases differences of 0, $\pi/2$, and $\pi$, respectively, obtained using the linear sampling system of FIG. 3. Fringes associated with delays between sampling pulses and data pulses are apparent.

Representative signal measurements performed using the apparatus of FIG. 3 can be described with reference to FIGS. 8A-14B. Using the thermooptic phase shifter 330 and the phase controller 334, the relative phase of a portion of the data signal delivered to the second balanced detector 316 can be selected. In an example, a voltage of about 3 V applied to the thermooptic phase shifter 330 produces a phase shift of about one radian. FIGS. 8A-8C show signals produced by the first and second balanced detectors as a function of delay for phase shifts of 0, $\pi/2$, and $\pi$ between the sampling pulse and the data signal. Typically the phase shift associated with FIG. 8B is selected for practical measurements. In this example, the total optical signal losses as measured using a non-polarized optical source were between about 9.5 dB and 10.1 dB, including a 6 dB loss associated with power splitting. Polarization dependent loss was about 0.6 dB.

Figure 9:
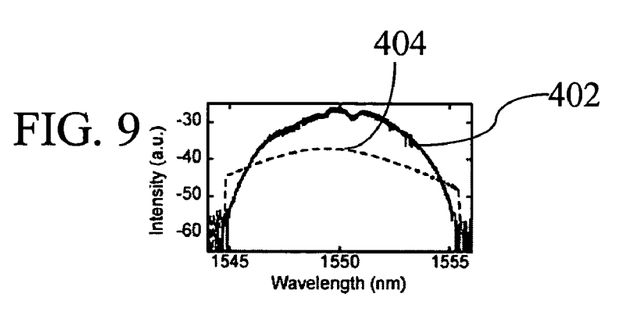
FIG. 9 is a graph of spectral density of a 640 Gb/s data signal (continuous line) and a spectral density of a sampling pulse (dashed line) after filtering by a free space grating-based optical filter. Prior to filtering, sampling pulse bandwidth is about 40 nm.

In representative measurements, sampling pulses had significant spectral components over a 40 nm wavelength range, and were spectrally filtered in order to better match sampling spectral density to data signal spectral density. Gaussian-shaped spectral filter profiles were used for data signals at bit rates below about 160 Gb/s. To accommodate the larger bandwidth of 1 ps pulses, the filter 310 was a free-space grating-based filter that provided an approximately rectangular pass band. FIG. 9 is a graph of spectral density 402 of a 640 Gb/s data signal, and a spectral density 404 of a sampling pulse after filtering by such a free space grating-based optical filter. This filtering enhances both resolution and sensitivity.

Figure 10A:
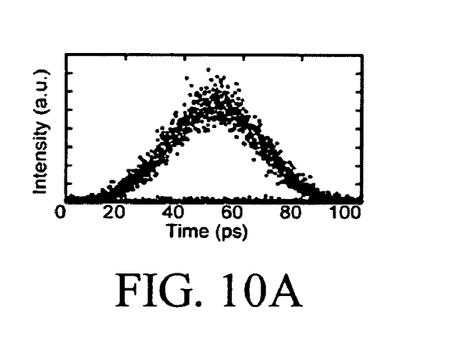
FIGS. 10A-10B are eye diagrams of 10 Gb/s RZ signals having a duty factor of 33% with a peak sampling power of about 50 mW and data signal average powers of about −20 dBm and −30 dBm, respectively.
Figure 10B:
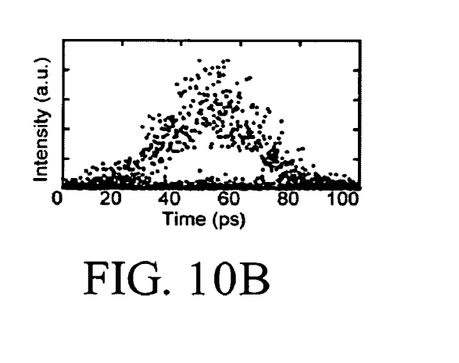
Figure 11A:
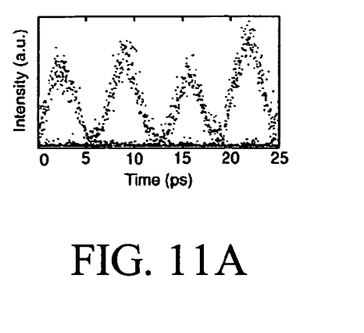
FIGS. 11A-11B are eye diagrams associated with a 160 Gb/s optical data signal based on 2.4 ps pulses from an actively mode-locked laser. Peak sampling pulse power is about 1.2 W, and data signal powers are about 0.4 mW and 0.05 mW, respectively.
Figure 11B:
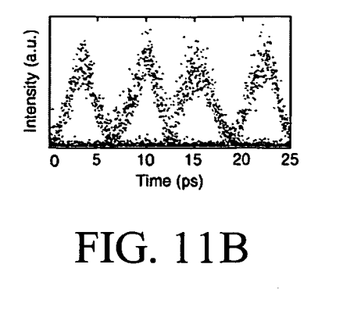

Eye diagrams obtained using the apparatus of FIG. 3 are shown in FIGS. 10A-11B. FIGS. 10A-10B are eye diagrams of 10 Gb/s 33% RZ signals with a peak sampling power of about 50 mW and data signal average powers of about −20 dBm and −30 dBm, respectively. FIGS. 11A-11B are eye diagrams of a 160 Gb/s optical data signal based on 2.4 ps pulses from an actively mode-locked laser. Peak sampling pulse power is about 1.2 W, and data signal powers are about 0.4 mW and 0.05 mW, respectively.

Figure 12:
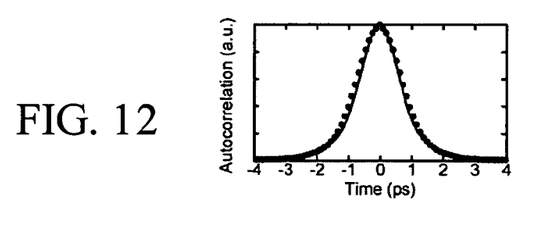
FIG. 12 is a graph illustrating an intensity autocorrelation obtained using a conventional nonlinear optical autocorrelator and an intensity autocorrelation calculated based on an intensity measured with linear optical sampling for pulse-compressed optical pulses having durations of about 1.2 ps.

Linear optical sampling measurements of pulse intensity as a function of time can be compared with pulse duration estimates based on conventional autocorrelations obtained using nonlinear mixing in a nonlinear optical material. FIG. 12 is a graph illustrating an intensity autocorrelation obtained using a conventional nonlinear optical autocorrelator (solid line) and an intensity autocorrelation calculated based on an intensity measured by linear optical sampling (markers) for pulse compressed optical pulses having durations of about 1.2 ps.

Figure 13A:
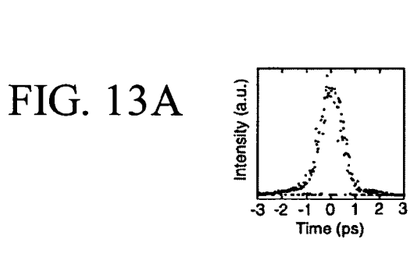
FIGS. 13A-13B are eye diagrams associated with a 10 Gb/s optical data signal at peak data signal powers of about 16 mW and 0.6 mW, respectively, and a peak sampling pulse power of about 5 W.
Figure 13B:
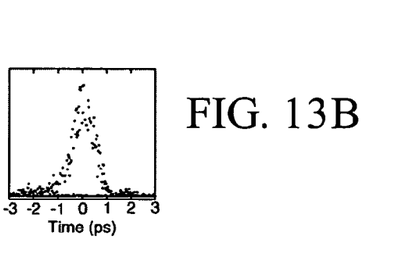
Figure 14A:
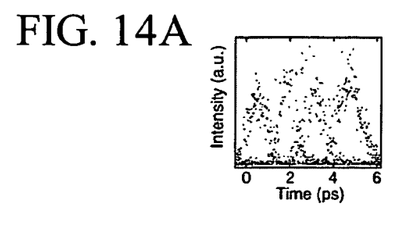
FIGS. 14A-14B are eye diagrams associated with a 640 Gb/s optical data signal at peak data signal powers of about 2.5 mW and 0.6 mW, respectively, and a peak sampling pulse power of about 5 W.
Figure 14B:
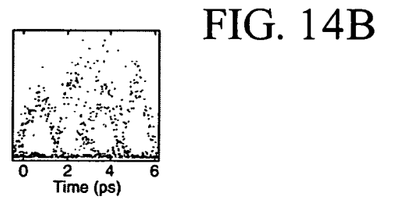

Additional eye diagrams are shown in FIGS. 13A-14B. FIGS. 13A-13B are eye diagrams of a 10 Gb/s optical data signal associated with peak data signal powers of about 16 mW and 0.6 mW, respectively, and peak sampling pulse power of about 5 W. FIGS. 14A-14B are measured eye diagrams of a 640 Gb/s optical data signal associated with peak data signal powers of about 2.5 mW and 0.6 mW, respectively, and peak sampling pulse power of about 5 W.

These measurements are representative only, and it will be apparent that the linear optical methods and apparatus described herein can be applied to measurement of a variety of optical signals, including data signals at bit rates greater than 640 Gb/s.

While FIGS. 1-3 illustrate particular arrangements for combining data and sampling pulses, other configurations can be used. For example, plate beam splitters can be used instead of beam splitter cubes, and fiber couplers can be replaced with plate or cube beam splitters. In addition, lenses or other beam shaping elements can be supplied as conventional lenses, mirrors, gradient index lenses, or diffractive optical elements. Non-polarizing fiber can be used, but in other examples polarizing fiber or polarization retaining optical fibers can be used. In other examples, a fully integrated optical sampler can be provided that integrates, for example, optical paths for both in-phase and quadrature balanced detection. In the configuration of FIGS. 1-2, linearly polarized data and sampling fields are used, and data and sampling pulses propagate on a common optical path, producing interferometric stability and permitting a ¼-wave retarder to introduce a $\pi/2$ phase shift.

Free space and waveguide optical hybrid systems for linear sampling are illustrated, but such systems can be built with different combinations of discrete and integrated waveguide components, including fully integrating the polarization diversity, beamsplitters, polarization and delay control optics, and the balanced detectors on a single planar lightwave chip. Likewise, linear sampling can be implemented using fiber optic components throughout or mixed with free space and/or waveguide optical components.

While examples are described above, it will be apparent that these examples can be modified in arrangement and detail without departing from the scope of the disclosure. For example, balanced detection signals are conveniently obtained by directly combining photocurrents from a pair of photodetectors, but in other examples, photodetector outputs can processed or amplified before combining. Free space and hybrid optical systems for linear optical sampling are illustrated, but such systems can be integrated in a waveguide device or in a holographic, interference-based device. Superior results are obtained with two balanced detectors, but a single balanced detector can be configured to alternately receive sample pulse/data pulse combinations. Phase differences can be established with various types of modulators, waveplates, or path difference configurations. A sampling pulse frequency can be selected to repetitively sample a single temporal location in a data bit interval, or selected to sweep through one or more bit intervals. Although typically less convenient for measurements of installed or operational data systems, the data pulse rate can be adjusted with respect to a fixed sampling pulse rate. We claim all that is encompassed by the appended claims.

We claim:

1. An optical sampling system, comprising:
a data input to receive a test signal;
a sampling pulse input to receive a sampling pulse;
an optical system configured to produce a first combination of the test signal and the sampling pulse having a first relative phase difference between the sampling pulse and the test signal, and to produce a second combination of the test signal and the sampling pulse;

a retardation plate configured to receive the second combination and to modify a relative phase difference between the sampling pulse and the test signal so that the second combination has a second relative phase difference, wherein the second relative phase difference is different from the first relative phase difference;

a first balanced detector and a second balanced detector configured to receive the first combination having the first relative phase difference and the second combination having the second relative phase difference, respectively, and produce a first balanced signal and a second balanced signal, respectively; and a signal processing system configured to combine the first balanced signal and the second balanced signal.

2. The optical sampling system of claim 1, wherein a difference between the first relative phase difference and the second relative phase difference is such that the balanced signal associated with the first relative phase difference is an in-phase signal and the balanced signal associated with the second relative phase difference is a quadrature signal.

3. The optical sampling system of claim 1, further comprising a memory configured to store sample values based on the combined first balanced signal and second balanced signal.

4. The optical sampling system of claim 3, further comprising a display to display the sample values as a function of a time period associated with the test signal.

5. The optical sampling system of claim 1, further comprising a controller configured to provide a variable time delay of the sampling pulse with respect to a period associated with the test signal.

6. The optical sampling system of claim 5, wherein the period is a bit interval.

7. The optical sampling system of claim 1, wherein the retardation plate is configured with an axis that is parallel to the polarization of either the test signal or the sampling pulse in the received second combination.

8. The optical sampling system of claim 1, wherein the retardation plate is a ¼-wave retarder.

* * * * *